United States Patent

Ramaseder et al.

[11] Patent Number: 6,142,765
[45] Date of Patent: Nov. 7, 2000

[54] PROCESS FOR BURNING FUEL

[75] Inventors: Norbert Ramaseder, Linz; Johannes Müller, Neumarkt; Stefan Dimitrov; Harald Berger, both of Linz; Johannes Steins, Gallneukirchen, all of Austria

[73] Assignee: Vost-Alpine Industrieanlagenbau GmbH, Linz, Austria

[21] Appl. No.: 09/029,795

[22] PCT Filed: Sep. 5, 1996

[86] PCT No.: PCT/AT96/00157

§ 371 Date: Jun. 4, 1998

§ 102(e) Date: Jun. 4, 1998

[87] PCT Pub. No.: WO97/09566

PCT Pub. Date: Mar. 13, 1997

[30] Foreign Application Priority Data

Sep. 7, 1995 [AT] Austria .................... 1484/95

[51] Int. Cl.[7] .................... F23M 3/00; B05B 7/06
[52] U.S. Cl. .................... 431/9; 431/165; 431/181; 431/351; 431/8; 431/10; 239/424.5; 239/406
[58] Field of Search .................... 431/8, 9, 10, 12, 431/181, 182, 190, 187, 186, 189, 159, 353, 115, 116, 351; 239/406, 424.5, 433, 281, 280.5, 283

[56] References Cited

U.S. PATENT DOCUMENTS

| | | | |
|---|---|---|---|
| 794,545 | 7/1905 | Phillips, Jr. | 431/354 |
| 1,299,968 | 4/1919 | Lewis | 431/186 |
| 1,904,469 | 4/1933 | Keller | 431/8 |
| 2,338,623 | 1/1944 | Crowe | 431/189 |
| 3,022,815 | 2/1962 | Bloom et al. | 431/185 |
| 3,092,166 | 6/1963 | Shepherd | 431/353 |
| 3,236,281 | 2/1966 | Bain et al. | 431/12 |
| 3,266,552 | 8/1966 | Denis | 431/12 |
| 3,285,240 | 11/1966 | Schmidt | 239/406 |
| 3,685,740 | 8/1972 | Shepherd | 239/424 |
| 4,116,388 | 9/1978 | Trozi . | |
| 4,475,885 | 10/1984 | Finke | 431/182 |
| 4,582,479 | 4/1986 | Battles . | |
| 4,610,625 | 9/1986 | Bunn | 431/182 |
| 4,622,007 | 11/1986 | Gitman | 431/10 |
| 4,642,047 | 2/1987 | Gitman | 431/10 |
| 4,797,087 | 1/1989 | Gitman | 431/10 |
| 4,907,963 | 3/1990 | Neff | 431/186 |

(List continued on next page.)

FOREIGN PATENT DOCUMENTS

| | | |
|---|---|---|
| 0 347 002 | 12/1989 | European Pat. Off. . |
| 0 368 829 | 5/1990 | European Pat. Off. . |
| 0 495 690 | 7/1992 | European Pat. Off. . |
| 0 513 414 | 11/1992 | European Pat. Off. . |
| 0 481 955 | 1/1995 | European Pat. Off. . |
| 35 20 781 | 12/1986 | Germany . |
| 36 12 682 | 10/1987 | Germany . |
| 42 38 020 | 8/1994 | Germany . |
| 1015581 | 1/1966 | United Kingdom . |
| WO89/02051 | 3/1989 | WIPO . |
| WO91/00366 | 1/1991 | WIPO . |
| WO91/06804 | 5/1991 | WIPO . |

OTHER PUBLICATIONS

Patent Abstracts of Japan for JP61062704, vol. 10, No. 227, (M–505), Aug. 7, 1986.

*Primary Examiner*—Ira S. Lazarus
*Assistant Examiner*—David Lee
*Attorney, Agent, or Firm*—Hill & Simpson

[57] ABSTRACT

A process for burning fuel which is formed of free hydrocarbons and/or fine-grained to dusty solid fuels, with a view to obtaining thorough mixing of the oxygen with the fuel in a manner as free of turbulences as possible, is characterized in that, into a main jet of oxygen or an oxygen-containing gas which is approximately cylindrical or slightly conically widening in the jet direction, several fuel jets oriented in a skew manner relative to the central longitudinal axis of the main jet are blown, which fuel jets are formed to surround the main jet peripherally, penetrate into the main jet and are sucked into the main jet.

24 Claims, 2 Drawing Sheets

U.S. PATENT DOCUMENTS

| | | | |
|---|---|---|---|
| 5,042,964 | 8/1991 | Gitman | 431/284 |
| 5,044,327 | 9/1991 | Hunt | 431/189 |
| 5,199,866 | 4/1993 | Joshi et al. | 431/187 |
| 5,241,949 | 9/1993 | Collier | 431/353 |
| 5,393,220 | 2/1995 | Couwels et al. | 431/10 |
| 5,599,375 | 2/1997 | Gitman | 75/10.42 |
| 5,714,113 | 2/1998 | Gitman et al. | 432/13 |
| 5,735,683 | 4/1998 | Muschelknautz | 431/353 |
| 5,858,302 | 1/1999 | Gitman et al. | 432/13 |

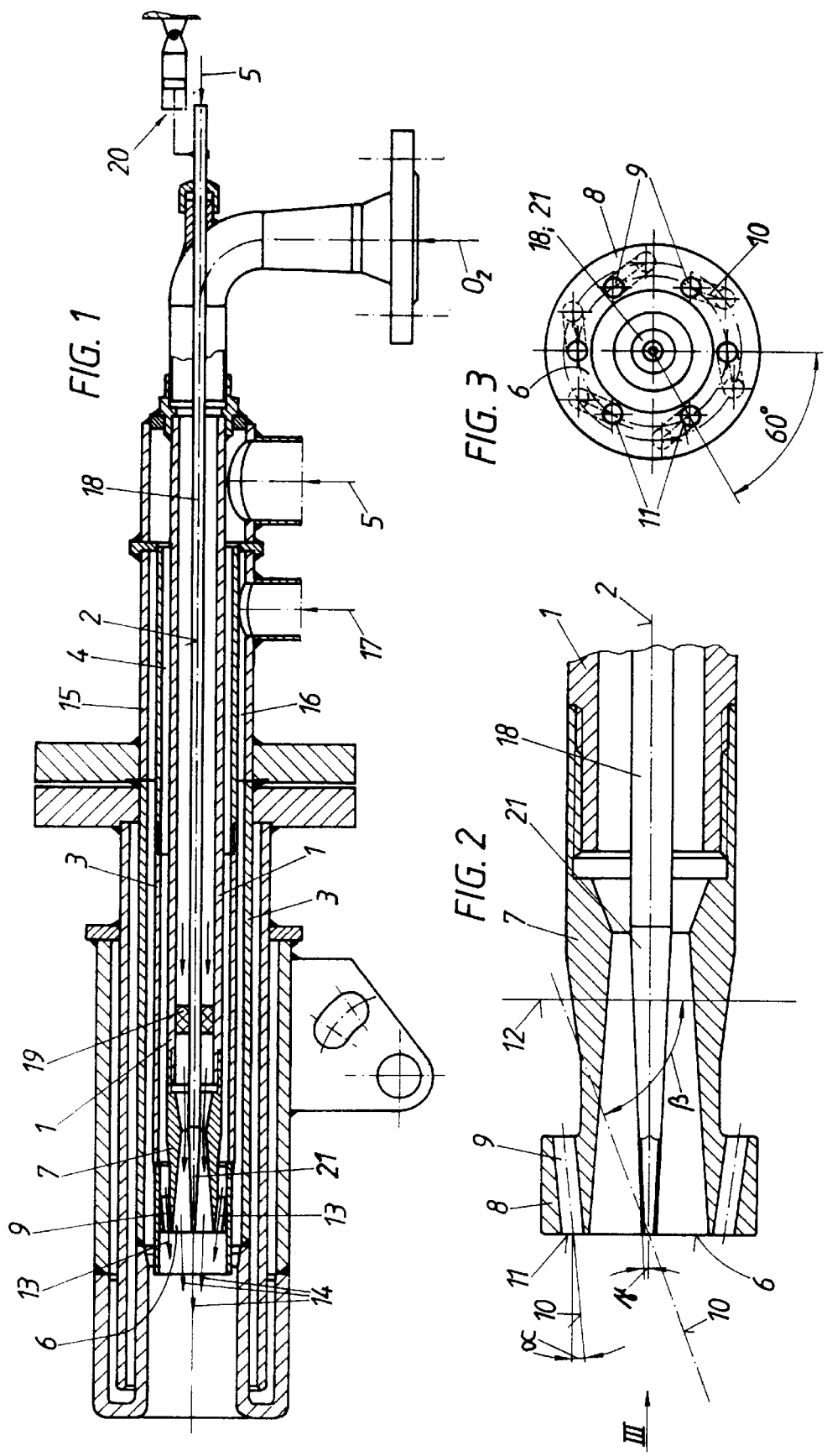

PROCESS FOR BURNING FUEL

BACKGROUND OF THE INVENTION

The invention relates to a process for burning fuel comprised of free hydrocarbons and/or fine-grained to dusty solid fuels, in particular in a metallurgical vessel. Furthermore, the invention relates to a burner for carrying out the process and a metallurgical vessel including a burner according to the invention.

Various types of construction are known of burners for burning gaseous, liquid or fine-particle solid fuels, in which oxygen or an oxygen-containing gas is supplied to the burner mouth separate from the fuels. Thus, for instance, from WO 91/06804 an oil burner is known, in which liquid fossile fuels emerge through a central tube and oxygen emerges through discharge openings provided radially about the central tube and parallel thereto, wherein a partial amount of the oxygen is allowed to emerge from the burner at a low speed and the remaining oxygen is allowed to emerge from the burner at a high speed. This is to avoid nitrogen oxides.

From EP-A-0 347 002 a burner is known, in which oxygen, by means of several oxygen jets which are directed against the axis of the burner at an angle of between 20° and 60°, is supplied towards solid fuel blown in centrally in the axial direction of the burner. This causes turbulences and the intimate mixing of the oxygen with the fine-particle solid fuel. This involves the disadvantage that, due to the substantial higher combustion speed of combustible gases externally surrounding the burner or burner jet as compared to the combustion speed of the fine-particle to dusty fuel, poor burning out of the fine-particle to dusty fuel supplied takes place. That known burner, furthermore, has the disadvantage of causing whirling with the oxygen immediately upon emergence of the fine-particle fuels from the central inner tube such that a focal spot is formed located closely at the burner mouth. This causes a high thermal load on the burner mouth and hence extensive wear.

A burner with which such an extensive wear is avoided is known from EP-B-0 481 955. In the burner known from that document, the supply of fuel is effected centrally and oxygen feeding occurs by means of oxygen jets peripherally surrounding the central fuel jet and inclined relative to the central fuel jet, the point of intersection of the oxygen jets with the fuel jet being located at a distance from the burner mouth.

A multi-media nozzle which may be employed also as a burner is known from DE-C-42 38 020. That known multi-media nozzle serves to introduce gaseous, liquid or pneumatically conveyable solid fuels as well as oxygen, the supply of the substances being effected through a central tube and through one or several annular gaps surrounding the central tube and defined by tubes arranged concentrically with the central tube. However, this involves problems with regard to the thorough mixing with the oxygen of the fuels supplied to the multi-media nozzle.

From DE-A-36 12 682, JP-A-61-062704 and EP-A-0 368 829 it is known per se for axes of fuel jets from burners to be directed such that they are oriented in a skew manner relative to the axes of other jets emerging from the burner, for example in a skew manner relative to a central main jet of the burner. Yet, in this, the arrangement is always chosen such that the fuel jets which are oriented in a skew manner relative to the main jet move away from the main jet from their site of origin onwards.

SUMMARY OF THE INVENTION

The invention has as its object to provide a process of the initially defined kind as well as a burner for carrying out the process, which are able to meet the following opposing demands in the optimum way: on the one hand, very good thorough mixing of the oxygen with the fuel is to be effected, yet, on the other hand, whirling effects should not occur or be kept as slight as possible. This is only difficult to realize, in particular, if optimum thorough mixing is to be achieved also in the marginal region of the burner jet. Another object of the invention is to be seen in rendering feasible output regulation within a wide range at a constantly uniform flame development by one and the same burner; thus, the burner is to be operable within a wide range of capacity at a stable and uniformly long flame. In doing so, only slight changes in the flame thickness are to occur in the total range of capacity.

With a process of the initially defined kind, this object is achieved in that a main jet of oxygen or an oxygen-containing gas is surrounded by several fuel jets oriented in a skew manner relative to-the central longitudinal axis of said main jet and the fuel jets are blown into the main jet which is approximately cylindrical or slightly conically widening in the jet direction, wherein the fuel jets are formed to surround the main jet peripherally and have a greater distance from the main jet at the site of origin than shortly thereafter, if viewed in the direction of flow, such that they penetrate into the main jet and are sucked into the main jet, wherein advantageously a further fuel jet of free hydrocarbons and/or fine-grained to dusty solid fuels is formed centrally within the main jet, said further fuel jet being annularly surrounded by the main jet.

A particularly stable flame within a very wide range of capacity may be achieved in that the main jet is accelerated to supersonic speed prior to the penetration of said fuel jets.

A burner for carrying out the process according to the invention, in particular for use in a metallurgical vessel intended for the production of liquid pig iron, steel preproducts or steel, is characterized by the combination of the following characteristic features:

- a first tube for forming a supply channel for oxygen and/or an oxygen-containing gas and a main jet of these gases,
- a second tube surrounding the first tube while forming an annular gap for supplying a fuel,
- wherein the annular gap discharges toward the exterior by a plurality of discharge channels peripherally surrounding the first tube and preferably designed as Laval nozzles, while forming individual fuel jets, and
- planes laid through the axes at mouths of the discharge channels and disposed parallel to the longitudinal axis of the main jet intersect the partial circle of the mouths, in a manner
- that the fuel jets penetrate into the main jet.

Preferably, the first tube internally is designed as a nozzle, preferably as a Laval nozzle.

The invention also relates to the exchange of fuel for oxygen in a manner that the main jet is formed of fuel and the skew jets and the flow from the central tube, if present, are formed of oxygen or an oxygen-containing gas, as well as a burner designed accordingly.

When arranging the burner at a metallurgical vessel, the former suitably is pivotably fastened to a supporting console arranged at the metallurgical vessel and projects inwardly through an opening of the metallurgical vessel for the purpose of supplying the fuel and/or the oxygen or oxygen-containing gas.

Advantageously, the burner is provided with a cover plate for covering said opening, which has a larger diameter than the burner, wherein suitably a plurality of damping plates sliding at one another and allowing for a pivotal movement of the burner are provided.

Furthermore, the burner advantageously is upwardly covered by a protection plate.

Other advantages and features of the invention will be readily apparent from the following description of the preferred embodiments, the drawings and claims.

BRIEF DESCRIPTION OF THE DRAWINGS

FIG. 1 is a cross-sectional view with portions in elevation taken along a central longitudinal axis of a burner of the present invention;

FIG. 2 is an enlarged cross-sectional view of the mouth of the burner of FIG. 1;

FIG. 3 is an end view of the mouth taken from the direction of arrow III in FIG. 2;

DESCRIPTION OF THE PREFERRED EMBODIMENTS

Figure 4:
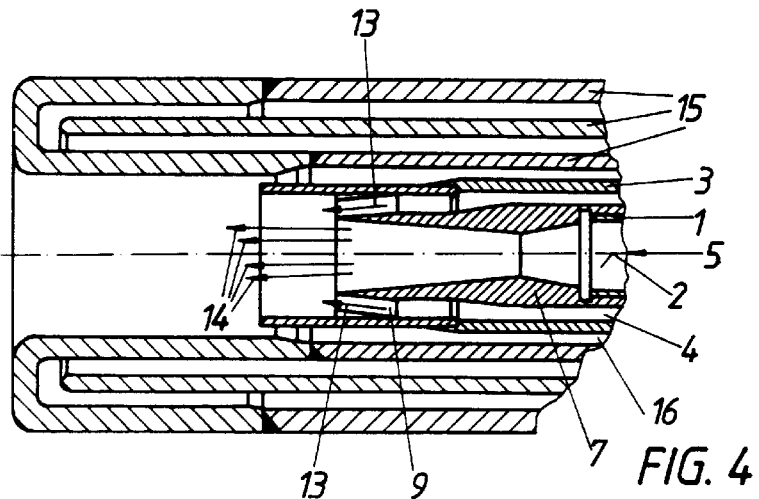
FIG. 4 is a cross-sectional view of a mouth of an embodiment of the burner of the present invention.

The burner represented in FIG. 1 comprises a first tube 1, through which oxygen and/or an oxygen-containing gas is supplied. That first tube 1 extends in the direction of the central longitudinal axis 2 of the burner and is surrounded by a second tube 3, by which an annular gap 4 is formed between the first and second tubes. Through that annular gap, solid, liquid or gaseous fuel 5 comprised of free hydrocarbons and/or fine-grained to dusty solid fuels capable of being conveyed pneumatically are supplied.

The inner side of the first tube 1, on the mouth end 6, which is formed by a separate mouth part 7 readily detachable from the first tube 1 by means of a screw connection, is configured in the manner of a Laval nozzle, which has a converging entrance portion which opens into a diverging exit portion, so such that the oxygen and/or oxygen-containing gas emerges from the mouth part 7 at supersonic speed.

The front end 6 of the mouth part 7 is provided with a flange 8 extending radially outwards, the flange 8 contacting the inner wall of the second tube 3 by its external periphery. Within the flange 8 discharge channels 9 for the fuel 5 are provided, which are configured in the following manner:

The central axes 10 of the discharge channels 9, which are arranged about the circumference of the first tube 1 in a uniformly distributed manner, are oriented in a skew manner relative to the central longitudinal axis 2 of the burner (which is identical with the central longitudinal axis of the first tube 1). The normal projection of each central axis 10 on a plane laid through the central longitudinal axis 2 and through the mouth 11 encloses an angle α of between 2° and 8° with the central longitudinal axis 2.

The central axes 10 of the discharge channels 9 enclose an angle β of between 85° and 60° with a plane 12 oriented perpendicular to the central longitudinal axis 2 of the burner. Thus, each of the axes 10 has a component along the axis 2, a component extending radially inward toward the axis 2 and a tangential component as shown in FIG. 3. This causes the fuel jets 13 emerging from the discharge channels 9 to penetrate into the radially symmetrical main jet 14 formed of oxygen and/or an oxygen-containing gas and to be sucked in by the same while developing a radially inward spiral or helical mixing motion with slight whirl formations and yet causing efficient mixing of the fuel 5 with the oxygen.

This also happens if the main jet 14 is formed of fuel and the jets 13 oriented in a skew manner relative to the same are formed of oxygen or an oxygen-containing gas. It merely has to be taken care that the mixing ratio of the two substances relative to each other remains the same in order to reach the optimum combustion process.

As mentioned above, the mouth part 7 of the first tube 1 is readily exchangeable such that mouth parts 7 including discharge channels 9 adapted to the respective fuels may each be inserted in the burner. Thus, for instance, for liquid fuels it is suitable to configure the discharge channels 9 as nozzles having small cross sections, namely as liquid spray diffusers. It is suitable to configure also the discharge channels 9 as Laval nozzles.

The second tube 3 externally is surrounded by a third tube 15, wherein a further annular gap 16 provided between the second tube 3 and the third tube 15 serves to feed air 17 or an inert gas. Thereby, it is feasible to influence the shape of the flame in a simple manner. This third tube 15 is provided with an internal cooling at least on the mouth side. It projects beyond the second tube 3, which, in turn, by its end projects beyond the end of the first tube 1, i.e., its end flange 8.

Centrally within the first tube 1 there is provided a central tube 18, which is kept in a precisely centrical position relative to the first tube 1 by means of spacers 19. This central tube 18, which likewise serves to supply fuel 5 in solid, liquid or dusty or fine-particle form, ends approximately on the level of the discharge channels 9; yet, it preferably is displaceable relative to the first tube 1 by a displacement means 20 schematically indicated in FIG. 1, thereby again being able to influence the flame formation.

The central tube 18 likewise comprises a readily dismountable mouth part 21, which may, for instance, be exchanged for an oil quill. This mouth part 21 is designed to taper in a frustoconical manner in the flow direction of the oxygen, the tapering beginning approximately from the narrow of the Laval nozzle-shaped inner side of the first tube 1. The aperture angle γ of the conical part 21 of the central tube 18 amounts to between 0.1 and 4°. Preferably, the central tube 18 on its inner side likewise is designed in a tapering manner. The pressure of the fuel 5 within the central tube 18 (closely before its mouth) is selected to correspond with that of the oxygen (closely before the mouth). The pressure of the fuel 5 supplied via the discharge openings 9 may be selected to differ from the oxygen pressure, yet a fuel pressure that corresponds with the oxygen pressure is advantageous also in that case.

According to the embodiment represented in FIG. 4, the burner has no central tube 18. It has been shown that for this embodiment the first tube 1 on its mouth in any event must be designed as a nozzle, a Laval nozzle being preferred.

It is also feasible for the skew discharge channels 9 to be formed of guide plates coiled helically around the longitudinal axis 2, which are arranged at the mouth-side end zone of the annular gap 4 and optionally are recessed from the mouth-side end of the annular gap 4.

Figure 5:
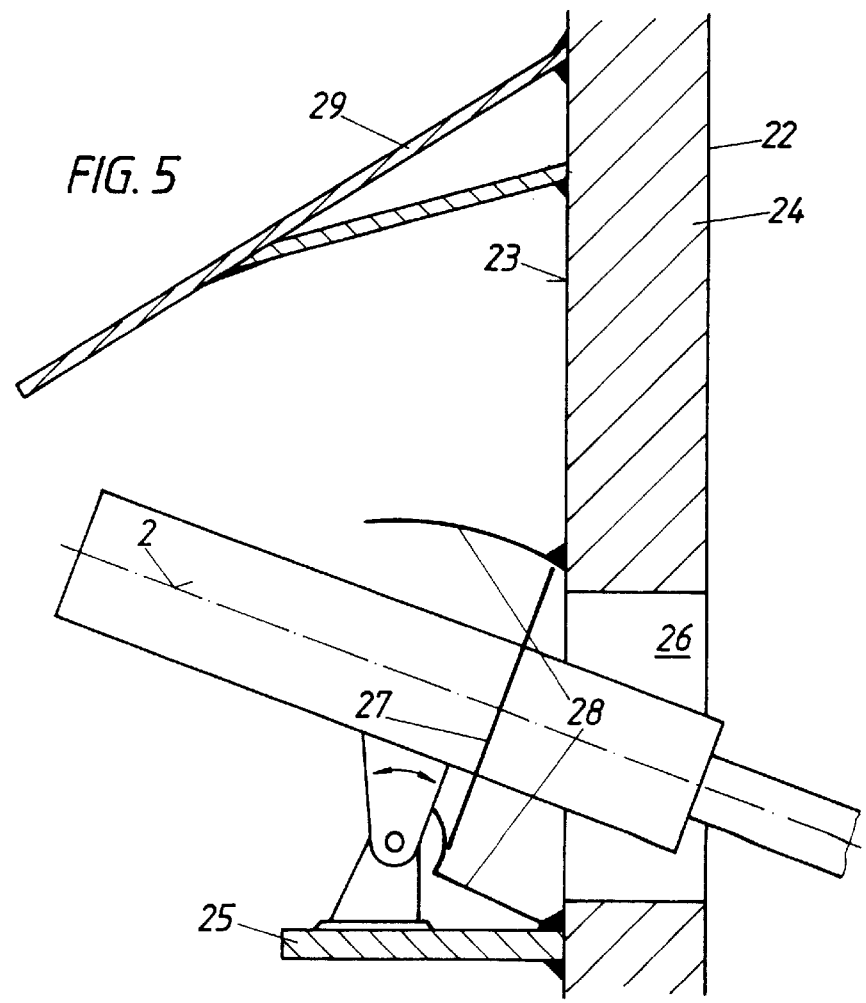
FIG. 5 is a partial cross-sectional view illustrating the installation of the burner of the present invention in a metallurgical vessel.

FIG. 5 illustrates the arrangement of a burner according to the invention within a metallurgical vessel 22, the burner being pivotably mounted on the external side 23 of the wall 24 of the metallurgical vessel 22 on a console 25 welded thereto. In order to supply the oxygen and the fuel 5, the burner by its rear end projects outwardly through an opening 26 of the wall 24 of the metallurgical vessel 22. For the purpose of silencing noises, the burner is provided with a cover plate 27 extending approximately perpendicular to its central longitudinal axis, which cover plate, in turn, cooperates with damping plates 28 arranged on the wall 24 of the metallurgical vessel 22 and allowing for a pivotal movement of the burner. To protect the burner from scrap and steel and slag pieces falling down, a protection plate 29 is provided above the burner, which likewise is fastened to the external side 23 of the wall 24 of the metallurgical vessel 22.

The burner according to the invention has the advantage of being usable universally, i.e., as a gas burner, as an oil burner or as a burner for pneumatically conveyable solid fuels. It is also feasible to process a mixture of those fuels. Furthermore, the burner may be used for afterburning as well as for a combined burner/afterburning operation. In addition, the burner is easy to dismount, structurally simple and easy to survey and producible at low cost.

In the following, the use of the burner is indicated by way of several variants:

a) ratio oxygen—natural gas larger than 2:1 (molar ratio)
b) ratio oxygen—natural gas+oil larger than 2:1 (molar ratio)
c) ratio oxygen—oil larger than 2:1 (molar ratio)
d) exclusively oxygen; no natural gas and no oil Points a) b) c) enable the burner to be employed as a burner simultaneously functioning as an afterburning lance (surplus of oxygen). According to point d) the burner may be operated as a mere afterburning lance.

In the following, the use as a gas burner is going to be explained in more detail:

$CH_4$ is supplied through the central tube 18. The first tube 1 serves to feed pure oxygen, the mouth part 7 being designed as a Laval nozzle. Through the discharge channels 9 provided between the first tube 1 and the second tube 3 $CH_4$ is supplied as well. The dimensions of the burner are as follows: The internal diameter of the central tube 18 is 8 mm, the wall thickness of the central tube is 1 mm. The critical diameter of the mouth part 7 designed as a Laval nozzle, of the first tube 1 is 19 mm. The internal diameters of the discharge channels 9 designed as cylindrical bores are 6 mm, six bores being uniformly distributed about the circumference of the first tube 1. The following Table indicates the pressures and quantities of the oxygen fed and of the $CH_4$:

| Discharge channels | | Laval nozzle | | Central tube | |
| --- | --- | --- | --- | --- | --- |
| $P_{CH4}$ [1] [bar] | $Q_{CH4}$ [Nm³/h] | $P_{O2}$ [1] [bar] | $Q_{O2}$ [Nm³/h] | $P_{CH4}$ [2] [bar] | $Q_{CH4}$ [Nm³/h] |
| 3 | 50 | 10 | 150 | 2.1 | 30 |
| 3 | 120 | 10 | 300 | 2.1 | 30 |
| 3 | 220 | 10 | 470 | 2.1 | 31 |

[1] Pressure within supply duct
[2] Pressure within central tube in front of mouth The use of the burner for the combined function of burner/afterburning lance or as a mere afterburning lance is feasible without any problem. The burner burns very stably within a relatively wide pressure range (depending on the critical diameter and on the prepressure of the media) and at a uniformly long constant flame. The flame thickness changes only negligibly within the total pressure range.

What is claimed is:

1. A process for burning fuel which is composed of free hydrocarbons and/or fine-grained to dusty solid fuels, said process comprising the steps of creating a main jet of oxygen-containing gas, accelerating the main jet to supersonic speed, and then surrounding said main jet with several fuel jets oriented in a skewed manner relative to a central longitudinal axis of the main jet, the fuel jets being blown helically into the main jet which is approximately a cylindrical flow in the jet direction, said fuel jets converging toward the main jet as they flow skewed to the direction of the main jet so that they penetrate into the main jet and are sucked into the jet.

2. A process according to claim 1, which includes introducing an additional jet of fuel centrally within the main jet so that the additional jet is annularly surrounded by the flow of the main jet.

3. A process for burning fuel comprising free hydrocarbons and/or fine-grained to dusty solid fuels, said process comprising the steps of creating a main jet of fuel having an approximately cylindrical shape as it extends in a first direct, accelerating the main jet to supersonic speeds, and then surrounding the main jet with several jets of a combustion-supporting gas oriented in a skewed manner relative to a central longitudinal axis of the main jet, said jets being blown helically into the main jet so that the oxygen-containing gases penetrate into the main jet, and providing an additional jet of oxygen-containing gas and introducing it centrally within the main jet so that the additional jet is annularly surrounded by the main jet.

4. A burner for carrying out a process of burning free hydrocarbon and fine-grained to dusty solid fuels, said burner comprising a first tube connected to a supply for oxygen-containing gas, said first tube terminating in a nozzle discharging a main jet of said gases, said nozzle having means for accelerating the main jet to supersonic speeds a second tube surrounding the first tube and forming an annular gap with the first tube, said second tube being connected to a supply of fuel, said annular gap having a plurality of discharge channels peripherally surrounding the first tube adjacent the nozzle thereof and forming individual fuel jets being skewed toward the first jet so that the individual fuel jets penetrate helically into the main jet.

5. A burner according to claim 4, wherein the means for accelerating comprises the nozzle of the first tube having a converging entrance portion connected to a diverging exit portion.

6. A burner according to claim 4, which includes a central tube connected to a fuel supply duct being provided centrally within the first tube and terminating adjacent the nozzle of the first tube.

7. A burner according to claim 6, wherein the central tube comprises a detachable mouth part.

8. A burner according to claim 6, wherein the central tube terminates in a tapering surface at the mouth of the central tube forming a nozzle configuration within the nozzle of the first tube.

9. A burner according to claim 8, wherein an aperture angle γ of the tapering surface of the central tube is between 0.1° and 4°.

10. A burner according to claim 6, wherein the central tube has an end tapering toward the mouth adjacent the nozzle of the first tube.

11. A burner according to claim 6, wherein the central tube is displaceably guided within the first tube in the direction of the central longitudinal axis of the first tube.

12. A burner according to claim 4, wherein a nozzle end of the first tube comprises a separate mouth part detachably connected with the first tube by means of a screw connection.

13. A burner according to claim 12, wherein the detachable mouth part of the first tube on a mouth side is provided with a flange extending radially outward, said flange comprising the discharge channels in the gap between the first and second tube.

14. A burner according to claim 4, wherein the second tube is surrounded by a third tube forming an additional annular gap for feeding air and/or inert gases to the burner.

15. A burner according to claim 14, wherein the third tube has means for cooling the third tube with water.

16. A burner according to claim 4, wherein an axis of each of the discharge channels of the second tube form an angle of between 2° and 8° with the central longitudinal axis of the first tube.

17. A burner according to claim 4, wherein the axis of the discharge channels includes an angle β of between 85° and 60° relative to a plane extending perpendicular to the central longitudinal axis of the first tube.

18. A burner for carrying out a process for burning free hydrocarbons and fine-grained to dusty solid fuels, said burner comprising a combination of a first tube for forming a supply channel for fuel and terminating in a nozzle discharging a main jet of the fuel, said nozzle having means for accelerating the main jet to supersonic speeds, a second tube surrounding the first tube and forming an annular gap for supplying oxygen and oxygen-containing gases, said annular gap discharging through a plurality of discharge channels peripherally surrounding the first tube and constructed as nozzles to form individual jets, said nozzles being skewed toward the main jet with axial, radial and tangential components so that the gases discharged by the nozzles penetrate helically into the main jet.

19. A burner according to claim 18, wherein a central tube connected to a source of oxygen-containing gas is provided centrally within the first tube so that oxygen is discharged centrally within the main jet.

20. A burner according to claim 19, wherein the central tube comprises a detachable fastening mouth part.

21. A metallurgical vessel comprising a vessel having a wall with an opening, a supporting console arranged at the opening, a burner being pivotably fastened to the support console and projecting into the opening, said burner having a first tube for forming a supply channel for oxygen and/or oxygen-containing gas and terminating in a nozzle creating a main jet of said gases, said nozzle having means for accelerating the main jet to supersonic speeds, a second tube surrounding the first tube and forming an annular gap for supplying fuel, said annular gap having a plurality of discharge channels peripherally surrounding the first tube and forming nozzles for creating individual fuel jets, said nozzles being skewed with radial, axial and tangential components toward the main jet so that the fuel jets penetrate helically into said main jet.

22. A metallurgical vessel according to claim 21, wherein the burner is provided with a cover plate for covering the opening, which is a larger diameter than the burner.

23. A metallurgical vessel according to claim 21, which includes a plurality of dampening plates sliding on one another and allowing for a pivotable movement of the burner.

24. A metallurgical vessel according to claim 21, wherein the burner is upwardly covered by a protective plate.

* * * * *